United States Patent
Oross et al.

(10) Patent No.: US 6,426,870 B1
(45) Date of Patent: Jul. 30, 2002

(54) SCRATCH RESISTANT STRUCTURAL SUPPORT FOR A PORTABLE ELECTRONIC DEVICE

(75) Inventors: Glen A Oross, Corvallis; Dennis R Esterburg, Philomath, both of OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/495,012

(22) Filed: Jan. 31, 2000

(51) Int. Cl.[7] .............................................. H05K 05/03
(52) U.S. Cl. ...................... 361/683; 361/724; 361/725; 361/726; 312/265.6; 312/223.1; 312/223.2; 220/544; D14/100; D14/102; D14/106
(58) Field of Search ................................. 361/683, 680, 361/724, 725, 726, 727; 312/223.1, 223.2, 265.6; D14/100, 102, 106; 220/523, 544, 552

(56) References Cited

U.S. PATENT DOCUMENTS

| | | | | |
|---|---|---|---|---|
| 4,567,317 A | * | 1/1986 | Ehrlich et al. ................. 174/35 |
| 4,965,408 A | * | 10/1990 | Chapman et al. ...... 174/35 MS |
| 5,329,422 A | * | 7/1994 | Sasaki ......................... 361/686 |
| 5,398,046 A | * | 3/1995 | Szegedi et al. ............. 345/174 |
| D374,442 S | * | 10/1996 | Ozaki ......................... D14/121 |
| 5,678,666 A | * | 10/1997 | Shyr et al. .................... 190/102 |
| 5,872,557 A | * | 2/1999 | Wiemer et al. ............. 345/156 |
| 5,889,230 A | * | 3/1999 | Katz ......................... 174/35 R |
| 5,931,297 A | | 8/1999 | Weill et al. ................. 206/320 |
| 6,000,767 A | | 12/1999 | Liu et al. .................. 312/223.2 |
| 6,002,581 A | | 12/1999 | Lindsey ...................... 361/680 |
| D426,548 S | * | 6/2000 | Oross et al. ............... D13/300 |
| 6,118,663 A | * | 9/2000 | Fan ............................. 361/725 |

* cited by examiner

Primary Examiner—Darren Schuberg
Assistant Examiner—David Foster

(57) ABSTRACT

A portable electronic device comprises, in one embodiment, one or more risers that protect an upper surface of the housing from being scratched. Additionally, the risers serve as bumpers to reduce damage to the device if it is dropped or bumped. Another embodiment of the present invention incorporates support members made from metal or metal alloy parts that are selectively attached to the laptop housing. These metal support members provide structural support for the housing and therefore aid in preventing the housing from twisting and bending. To further strengthen the housing, a metal frame is used in the upper and/or lower surface of the housing. The frame also serves to protect the enclosed electronics from electromagnetic interference.

26 Claims, 6 Drawing Sheets

SCRATCH RESISTANT STRUCTURAL SUPPORT FOR A PORTABLE ELECTRONIC DEVICE

FIELD OF THE INVENTION

This invention relates to computing devices and more particularly to an apparatus and method of strengthening and protecting the housing for a portable electronic device.

BACKGROUND OF THE INVENTION

The first personal computers were introduced to the work place, in substantial numbers, in the early 1980's. Since then, the popularity of computers in the workplace has grown tremendously. Today, computers are commonplace in most work environments and are essential to many daily business transactions.

The first computers introduced to the workplace were stationary and primarily designed to sit on a platform, such as a desk or table. However, as new low-power electronic circuitry such as complementary metal oxide semiconductor (CMOS) was developed alongside new longer lasting batteries (nickel hydride), portable computers began to emerge. Portable computers were attractive to many industries because employees were less confined to their offices. Work could be completed at home or on business trips away from the office.

Portable computers can be classified as being either (a) handheld (palmtop), (b) luggable or (c) laptop (notebook) computers. Palmtop computers are generally characterized by their size and computing capability, which is typically less than a desktop or laptop computer. An example of a palmtop computer is an HP 300LX. Luggable computers are, in essence, desktop computers that are portable. These computers are generally constructed with a handle or handgrip by which the luggable computer may be carried. An example of a luggable computer is an Apple iMac™. Notebook computers are generally characterized by their size and weight as well but their computing capability may equal or exceed that of a luggable or desktop computer. An example of a laptop computer is a Hewlett-Packard OmniBook 900™.

Modern laptop computers are much thinner than their predecessors. The outer surface or housing is typically composed of molded plastic. A display unit (an upper portion of the housing) is attached to a base unit (lower portion of the housing). The lower portion of the housing contains most of the electronic circuitry (henceforth referred to as electronics) and is attached to the upper portion of the housing with a hinge. The housing surrounding the display is typically constructed of molded plastic and consequently is susceptible to bending and twisting which could damage the enclosed electronics. Additionally, if the computer is dropped, the housing does not provide enough protection to prevent damage to the internal electronics. Some computer manufacturers have addressed this problem by constructing selected portions of the housing, specifically the upper portion that supports the screen, of metal. A preferred metal used to construct the upper portion of the laptop housing is magnesium.

Magnesium is a metal that is silvery white in color and is extremely light in weight. Magnesium is approximately two-thirds the density of aluminum and can be combined with other metals to create alloys that are extremely strong. In this regard, magnesium is well suited as a structural material for use in laptop computers. Additionally, magnesium is not very reactive; for example, magnesium reacts only slightly with most organic chemicals including hydrocarbons, aldehydes, alcohols and most oils. Thus, as an outer surface material (housing) for a laptop computer, magnesium is essentially stain resistant.

Manufacturers of conventional laptop computers employing magnesium as a structural material, however, are met with new challenges: (1) molded or die cast magnesium parts, which are commonly used to form the upper surface of the laptop housing, are still lacking in providing adequate support to prevent the upper housing from substantially bending and twisting; (2) magnesium is typically painted when used as a surface material. The painted surface is easily scratched and consequently causes the laptop to appear older thus creating an appearance of being inferior in quality; and (3) magnesium, as a housing material for a laptop computer, is significantly more expensive than molded plastic. Unless one or more of these challenges are addressed, many prospective users of portable electronic devices will conclude that the problems associated with using these devices outweigh their benefits.

SUMMARY OF THE INVENTION

A portable electronic device comprises, in one embodiment, one or more risers that protect an upper surface of the housing from being scratched. The risers serve as bumpers to reduce damage to the device if it is dropped or bumped. Another embodiment of the present invention incorporates support members made from metal or metal alloy parts that are selectively attached to the laptop housing. These metal support members provide structural support for the housing and therefore aid in preventing the housing from twisting and bending. To further strengthen the housing, a metal frame is used in the upper and/or lower surface of the housing. The frame also serves to protect the enclosed electronics from electromagnetic interference.

DETAILED DESCRIPTION

In a preferred embodiment of the present invention, a housing for a portable electronic device is described. The housing addresses many of the aforementioned challenges associated with manufacturing laptop computers including providing structural support necessary to prevent bending and twisting of the laptop housing, protecting the upper surface of the housing from being scratched and lowering manufacturing costs associated with providing a substantially metal (magnesium) housing.

Figure 1A:
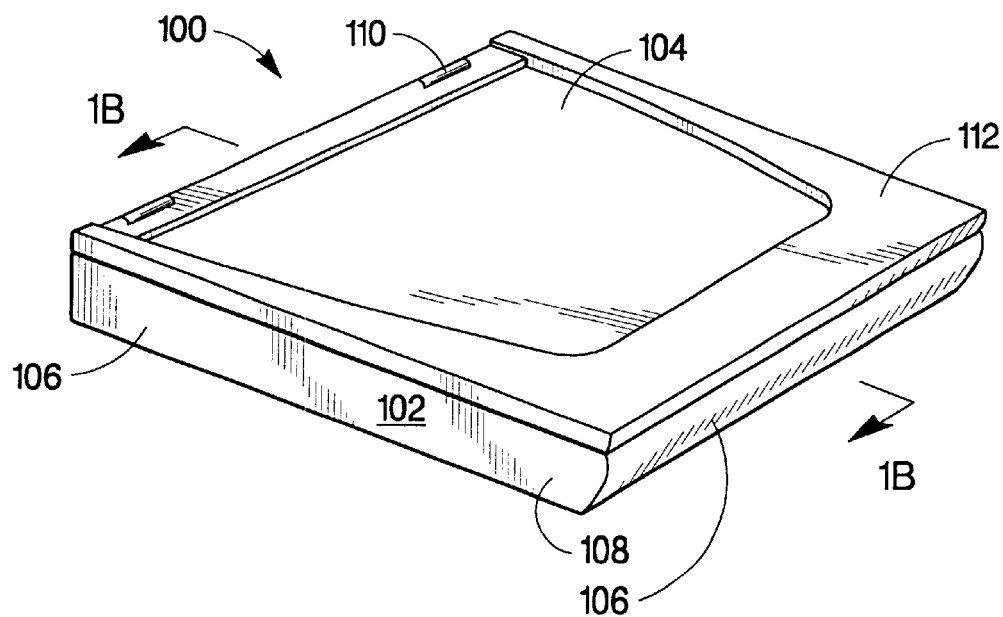
FIGS. 1A–B is a perspective view of a preferred embodiment of the present invention wherein a portable electronic device has a riser on the upper surface.
Figure 1B:
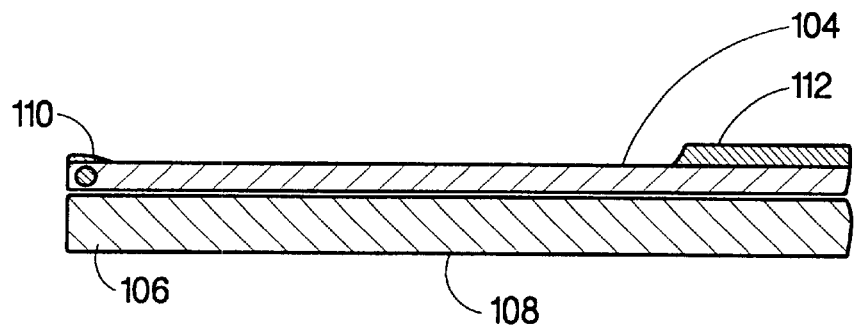

FIG. 1(a) shows a perspective view of a preferred embodiment of the present invention comprising a housing 102 (outer shell) for a portable electronic device 100. While a portable computer is shown in FIG. 1(a) as portable electronic device 100, those skilled in the art will appreciate that portable electronic device 100 could also be a portable CD player, game device, global positioning system (GPS) receiver, cellular phone or other portable electronic devices and still fall within the spirit and scope of the present invention. The housing 102, as shown in FIG. 1(a), further comprises an upper surface 104, lateral surfaces 106, a lower surface 108, a hinge 110 and a riser 112. In a preferred embodiment of the present invention, the upper surface 104 of the housing 102 is formed of magnesium, although other metals and metal alloys may be used, such as aluminum, titanium, and magnesium-aluminum-zinc. The lower surface 108 and lateral surface 106 of the housing 102 are preferably formed from molded plastic. Although FIG. 1(a) shows a preferred embodiment of the present invention where a base unit and a display unit are hinged together, those skilled in the art will appreciate that the aforementioned embodiment may comprise an unhinged single unit. FIG. 1(b) shows a cross-section of FIG. 1(a) where the riser 112 protrudes above the upper surface 104. In a preferred embodiment, the height of the riser above the upper surface 104 typically ranges from 0.01 to 2 cm although risers of greater or lesser heights could be used. The riser 112 serves several functions such as shielding the upper surface 104 from unwanted scratches and providing a "bumper" that minimizes damage to the enclosed electronics if portable electronic device 100 is dropped or bumped. In a preferred embodiment of the present invention, the riser is made from molded plastic. Other materials may be used to form the riser, including rubber, wood, leather, metal, graphite or other carbon composites.

Figure 2A:
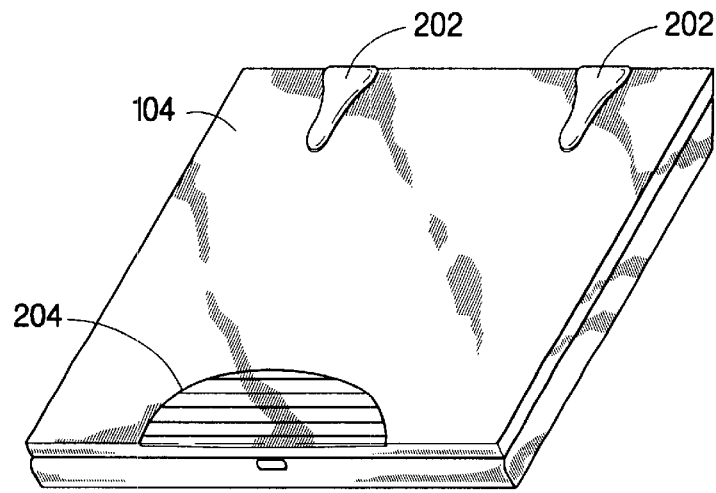
FIGS. 2A–B shows a portable electronic device in an alternative embodiment where a grip serves as a riser.
Figure 2B:
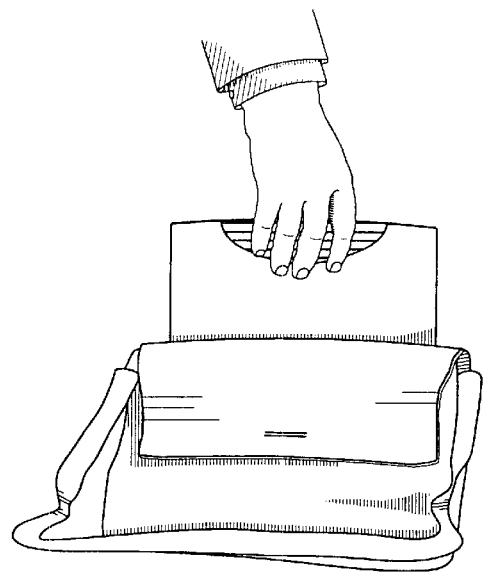
Figure 2C:
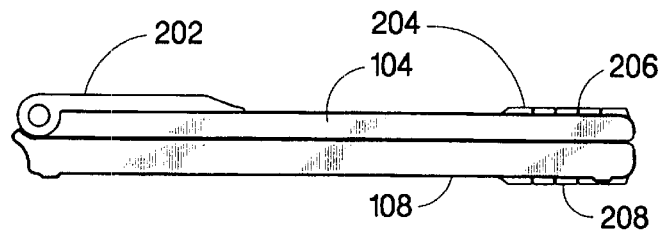
FIG. 2C shows a side view of a portable electronic device housing in an alternative embodiment wherein a hinge assembly serves as a riser.

A second embodiment of the invention is shown in FIG. 2(a). Here, the hinge 202 serves as a first riser and a grip 204 serves as a second riser. The grip 204 is used in handling the portable electronic device (as shown in FIG. 2(b)) and reduces the risk of dropping the device. Grip 204 is preferably detachable and can be replaced with a grip of a different color, thus creating a "fashionable" accessory for the portable electronic device. The combination of the first riser (hinge) and second riser (grip) significantly reduces scratching of the upper surface 104 because an object placed on top of the device will be displaced from the first surface. The grip 204 comprises ridges 206 that enhance traction between one's hand and the housing. The ridges 206 are orthogonal to the length of one's fingers as shown in FIG. 2(b). FIG. 2(c) shows a side view of the housing as shown in FIG. 2(a). Here, the hinge 202 and the grip 204 are substantially the same height relative to the upper surface 104. In an embodiment of the present invention, a complementary grip 208 may be attached in substantially the same location on the lower surface 108 of the housing as shown in FIG. 2(c).

Figure 3A:
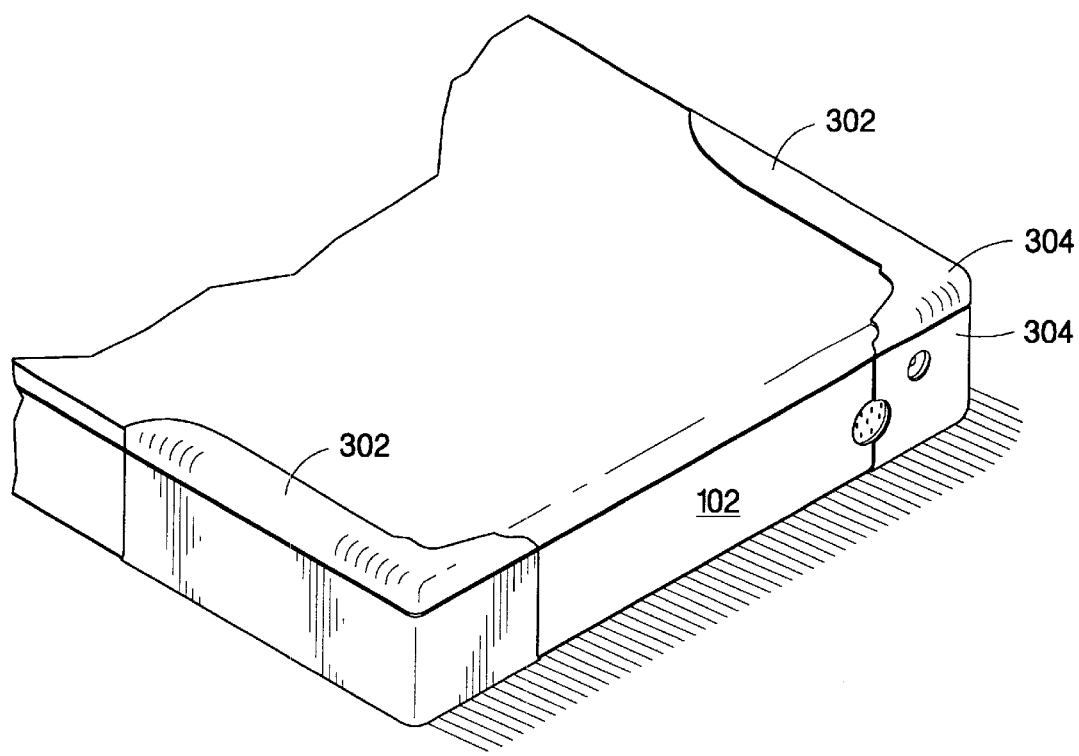
FIGS. 3A–B shows magnesium parts being used to strengthen a portable computer housing in an alternative embodiment of the invention.
Figure 3B:
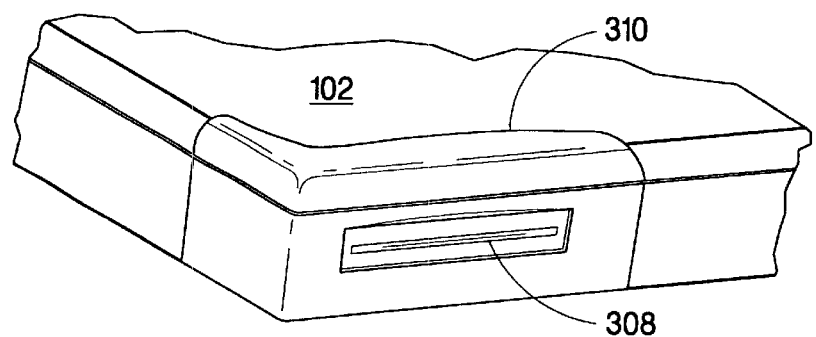

FIG. 3(a) shows a lower cost embodiment of the present invention where support members 302 (preferably made of magnesium or other metal or metal alloy) are strategically attached to the housing 102 (which is typically made from plastic) in areas where structural support is most needed. Reducing the amount of magnesium used for the housing directly reduces manufacturing costs but by strategically placing the magnesium parts on the "plastic housing" does not significantly compromise structural integrity. For example, in FIG. 3(a), the corner 304 is encased by the support member 302. Encasing the corner as such makes the housing more rigid and difficult to twist. Note, however, that support member 302 may be formed of plastic and a selected portion of the upper surface may be a metal or metal alloy. Similarly, FIG. 3(b) shows a support member 310 used to provide structural support to the housing 102 and a disk drive 308. Additionally, the magnesium parts are aesthetically pleasing and may be formed using a magnesium alloy. The metal additives used to form the alloy may be chosen to alter the color of the part. Consequently, the part may not require painting and therefore scratching the part may not create a perception of poor quality.

Figure 4A:
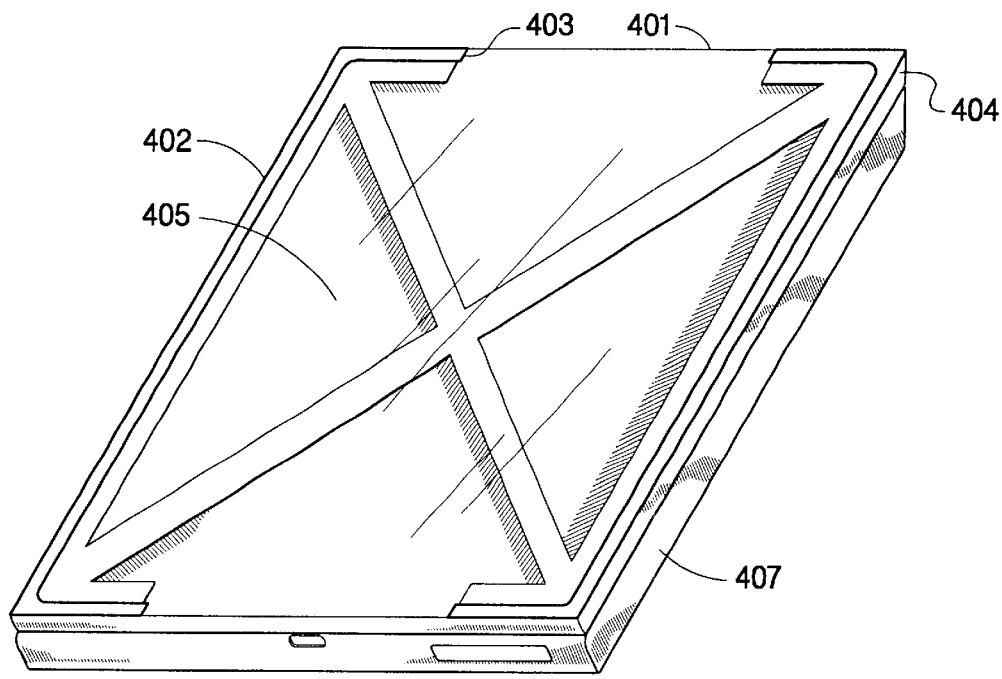
FIGS. 4A–C shows an embodiment of the invention wherein a frame is made from a metal or metal alloy and is used to strengthen the display unit.

FIG. 4(a) shows an embodiment of the present invention comprising a display unit 404 and a base unit 407. The display unit further comprises a frame 402 and a top 401. The frame is preferably formed of magnesium or other metal or metal alloy and the top 401 is preferably made of plastic. The top 401 is inserted into the frame 402 and overlays a selected portion of frame 402 as shown in FIG. 4(a). The top 401 and the frame 402 form an upper surface 405, as shown in FIG. 4 (a). The top 401 in one embodiment of the present invention is preferably substantially transparent, thus adding aesthetic value to the housing. The top 401 in this embodiment is removable and can be replaced with a top of a different color.

Figure 4B:
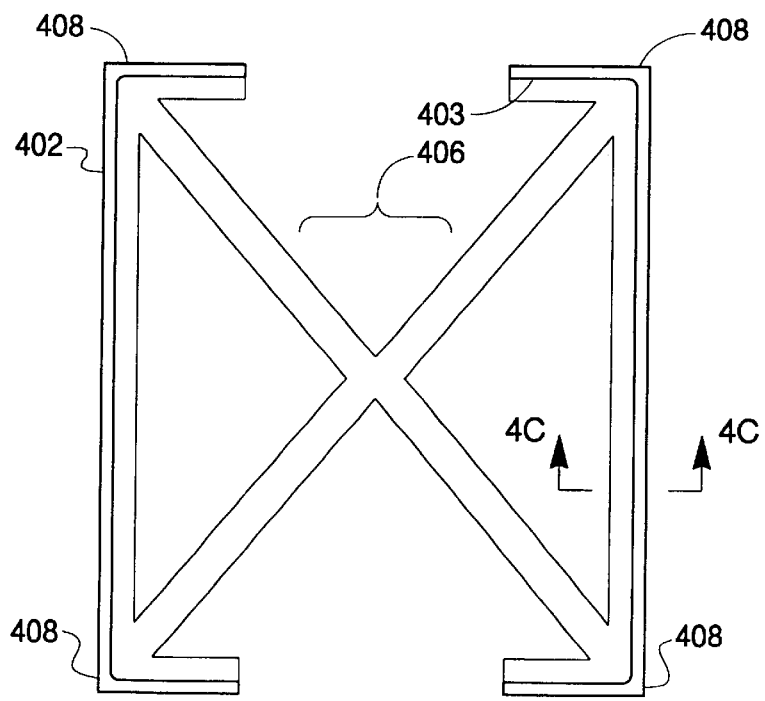

A crossbeam 406 bisects four corners 408 of frame 402 shown in FIG. 4(b).

Figure 4C:
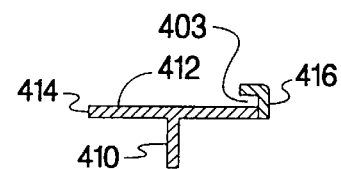

Additionally, the frame 402 preferably comprises a slot 403 in which the top may be inserted although an embodiment has been contemplated where slot 403 is not present. FIG. 4(c) shows a cross-section of a portion of the frame as shown in FIG. 4(b). Here, the frame is configured in a "T" shape wherein the vertical member 410 has a first end 414 and a second end 416. The vertical member forms a right angle with the horizontal member 412 thereby adding additional strength to the frame.

Figure 5A:
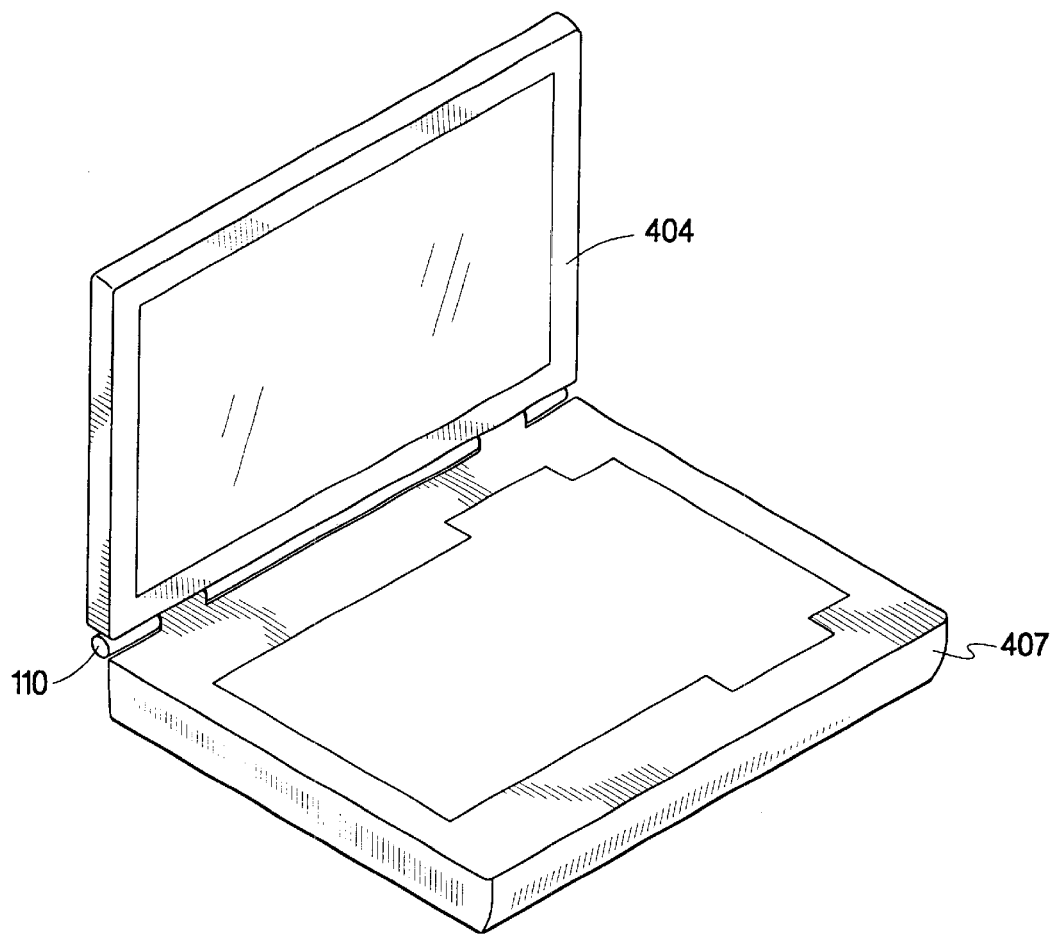
FIGS. 5A–B shows a structural support member to which the portable electronic device housing is attached.
Figure 5B:
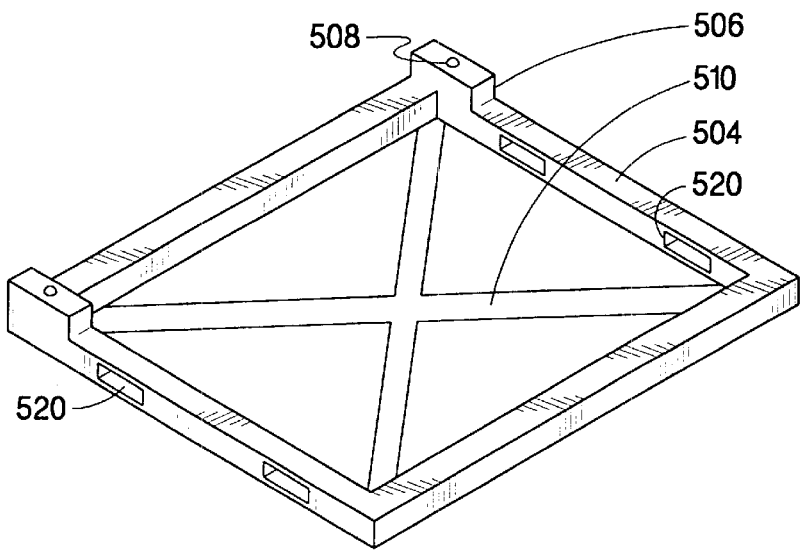

The structural designs shown in FIGS. 4(a) and 4(b) significantly strengthens the display unit 404. The base unit 407 may be similarly strengthened by incorporating frame 504 (preferably made of magnesium or other metal or metal alloy) shown in FIG. 5(b) into the base unit 407 shown in FIG. 5(a). Frame 504 comprises an anchor 506 used to support the hinge 110 (shown in FIG. 5a). The anchor 506 contains a threaded aperture 508 to which the hinge 110 used to couple the display unit and the base unit 407 is bolted. Adding a crossbeam 510 similar to crossbeam 406 shown in FIG. 4(b) may be desirable to further strengthen frame 504. Frame 504 also contains grooves 520 to which the base unit 407 is attached. An additional advantage to using frame 504 as shown in FIG. 5(b) is that a frame made out of a metal or metal alloy reduces electromagnetic interference that may be generated by electronic devices in the vicinity of the portable electronic device. The frame reflects electromagnetic waves that may otherwise interfere with the electronics of the portable electronic device.

Figure 6A:
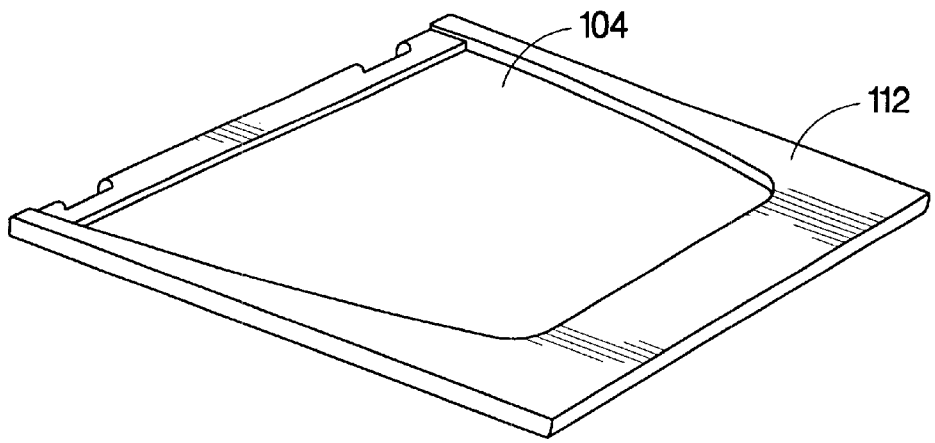
FIGS. 6A–B shows a portion of the portable electronic device housing wherein the riser is removed thereby revealing apertures formed in the upper surface.
Figure 6B:
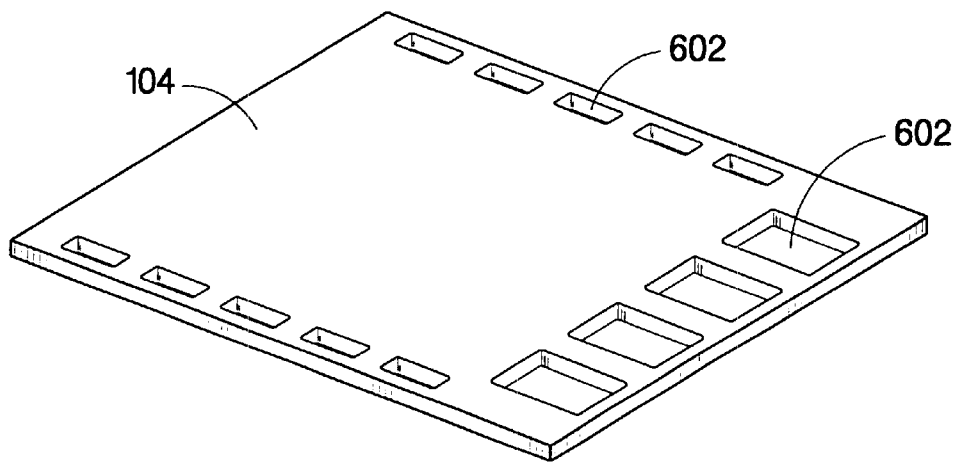

FIG. 6(a) shows the upper surface of the housing 104 and riser 112 previously shown in FIG. 1(a). FIG. 6(b) shows the upper surface where the riser 112 has been removed. The upper surface comprises apertures 606 that are selectively placed along the perimeter of the upper surface (which is preferably made of magnesium or other metal or metal alloy) although the apertures may be formed in an area of the upper surface. The apertures 602, in addition to reducing the weight of the housing, reduces manufacturing cost because less metal is used to form the upper surface 104.

We claim:

1. A portable electronic device comprising:
   an upper surface, a lower surface and at least one lateral surface;
   a riser affixed to at least one surface chosen from the upper surface, the lower surface, and the at least one lateral surface, thereby protecting the at least one surface from being scratched; and
   at least a substantial portion of the at least one surface chosen is a metal or metal alloy.

2. The portable electronic device of claim 1, wherein the at least a substantial portion of the at least one surface is formed from a group of materials chosen from magnesium, aluminum, titanium and magnesium-aluminum-zinc.

3. The portable electronic device of claim 1, wherein the riser substantially surrounds the upper surface of the portable electronic device.

4. The portable electronic device of claims 1, wherein the riser forms a grip.

5. The portable electronic device of claim 4, wherein the grip is selectively removable from a surface.

6. The portable electronic device of claim 5, wherein the grip further comprises grooves, the grooves providing traction for gripping the housing.

7. The portable electronic device, claim 1, wherein the upper surface comprises at least one aperture upon which a riser is placed.

8. The portable electronic device of claim 1, wherein the riser is formed from a group of materials chosen from plastic, rubber, carbon composites, metal, wood, leather, and graphite.

9. The portable electronic device of claim 1, wherein the upper surface is coupled to the lower surface with a hinge.

10. The portable electronic device of claim 9, wherein the hinge is a riser attached to the lower surface.

11. A housing for a portable electronic device comprising:
    an upper surface, wherein the upper surface is made of metal in which an aperture of substantial size is formed, thereby reducing the weight of the upper surface;
    a lower surface;
    at least one lateral surface, a riser affixed to at least one surface chosen from the upper surface, the lower surface and the at least one lateral surface, the riser protecting the at least one surface from being scratched; and
    at least a substantial portion of the at least one surface chosen is a metal or metal alloy.

12. The housing of claim 11, wherein the upper surface is made of metal in which an aperture of substantial size is formed, thereby reducing the weight of the upper surface.

13. The housing of claim 12, wherein the aperture is formed substantially along a perimeter of at least the upper surface.

14. The housing of claim 11, wherein a color-enhancing additive is selectively disposed in the metal alloy.

15. The housing of claim 11, wherein the aperture is formed substantially within an area of at least the upper surface.

16. The housing of claim 13, wherein the upper surface is a frame made from a metal alloy, the frame comprises a slot in which a plastic upper surface is inserted.

17. The housing of claim 16, wherein the slot is substantially formed along a perimeter of the frame.

18. A portable electronic device comprising:
    a base unit;
    an upper surface; and
    a display unit, the display unit and base unit are hingably attached, the display unit further comprises;
       a frame and a top, the top is capable of being inserted into the frame and overlays a selected portion of the frame thereby forming an upper surface for the portable electronic device, wherein the frame comprises a vertical member that is substantially orthogonal to a horizontal member, the vertical member is positioned substantially at a midpoint of the horizontal member.

19. The portable electronic device of claim 18, wherein the frame comprises a slot along a selected portion of a perimeter of the frame capable of receiving a portion of the top.

20. The portable electronic device of claim 18, wherein the top is selectively removable.

21. The portable electronic device of claim 18, wherein the top is rigidly affixed to the frame.

22. The frame of claim 18, further comprising a first end and a second end, the second end forms a slot wherein the top is inserted.

23. The portable electronic device of claim 18, wherein the frame comprises a cross member.

24. The frame of claim 23, wherein the top overlays the cross member.

25. The portable electronic device of claim 18, wherein the frame provides electromagnetic interference protection.

26. The portable electronic device of claim 18, wherein the frame is hinged to the base unit.

* * * * *

UNITED STATES PATENT AND TRADEMARK OFFICE
CERTIFICATE OF CORRECTION

PATENT NO.    : 6,426,870 B1
DATED         : July 30, 2002
INVENTOR(S)   : Glen A. Oross et al.

It is certified that error appears in the above-identified patent and that said Letters Patent is hereby corrected as shown below:

Title page,
Item [75], Inventors, delete "Esterburg" and insert therefor -- Esterberg --

Column 5,
Line 19, delete "claims" and insert therefor -- claim --
Line 26, delete "device," and insert therefor -- device of --
Lines 38-40, delete "wherein the upper surface is made of metal in which an aperture of substantial size is formed, thereby reducing the weight of the upper surface;"

Signed and Sealed this

Twenty-first Day of September, 2004

JON W. DUDAS
*Director of the United States Patent and Trademark Office*